March 20, 1934.   J. L. CREVELING   1,951,503
LUBRICATION DEVICE
Filed Sept. 17, 1931   5 Sheets-Sheet 1
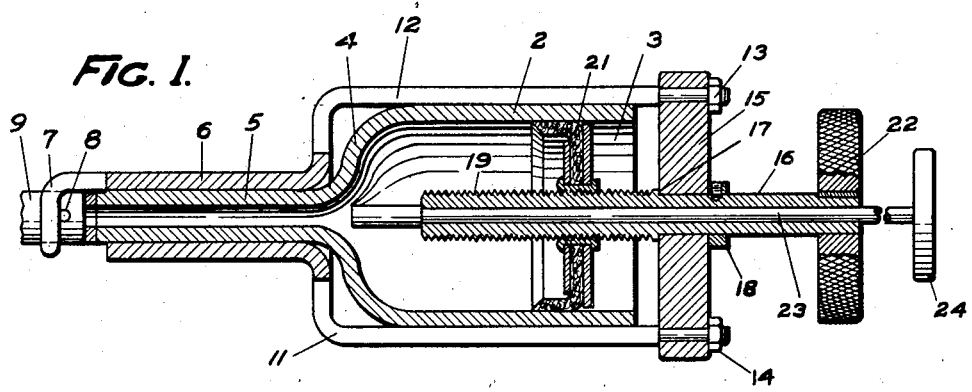
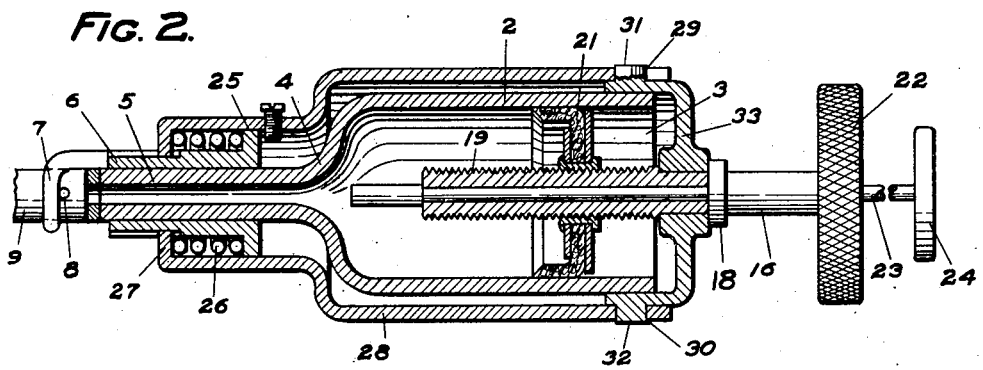
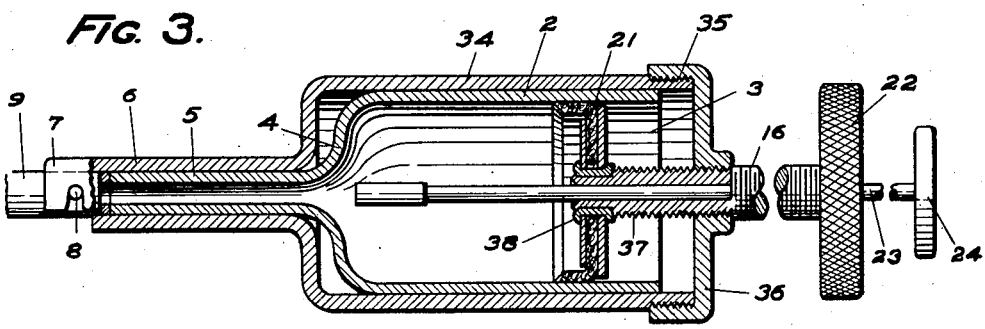
INVENTOR.
JOHN L. CREVELING
BY
ATTORNEY.

March 20, 1934.  J. L. CREVELING  1,951,503
LUBRICATION DEVICE
Filed Sept. 17, 1931    5 Sheets-Sheet 2
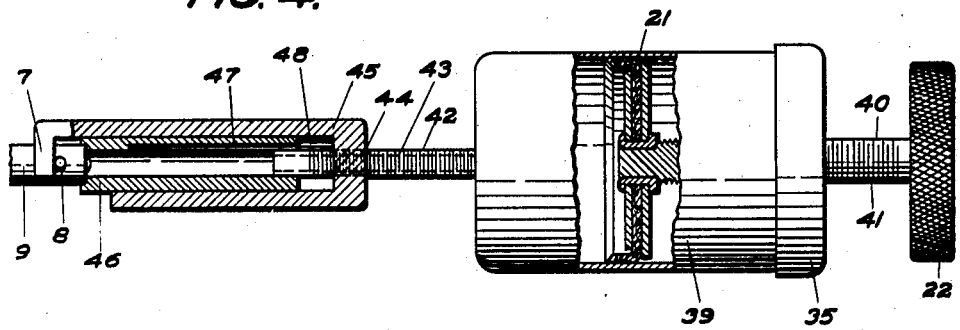
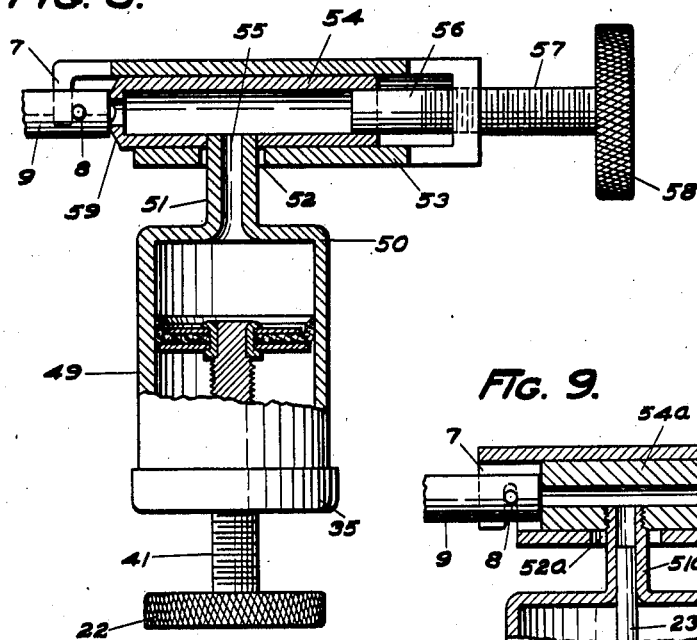
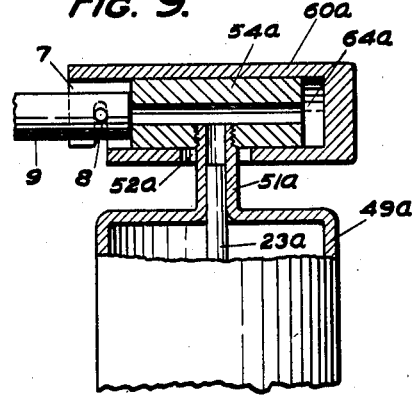
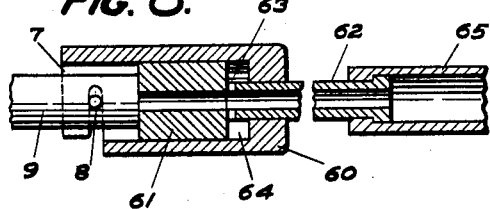
INVENTOR.
JOHN L. CREVELING
BY
ATTORNEY.

INVENTOR.
JOHN L. CREVELING
BY
ATTORNEY.

March 20, 1934.  J. L. CREVELING  1,951,503
LUBRICATION DEVICE
Filed Sept. 17, 1931   5 Sheets-Sheet 4
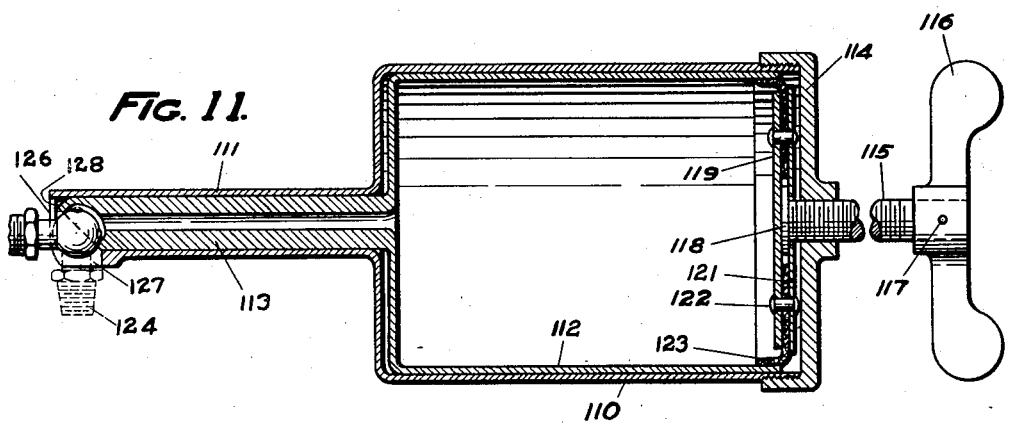
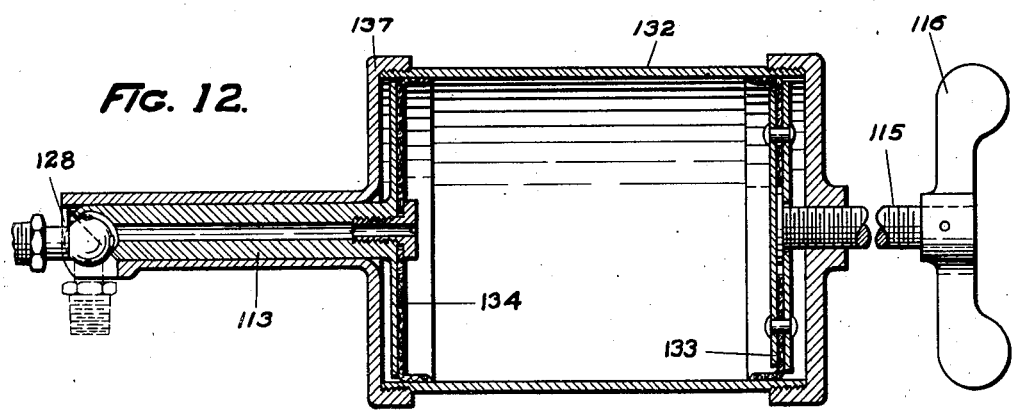
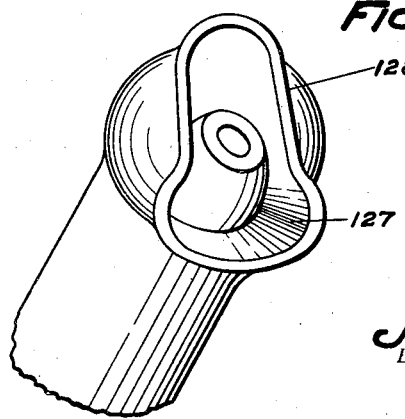
INVENTOR
JOHN L. CREVELING
BY
ATTORNEY March 20, 1934.  J. L. CREVELING  1,951,503
LUBRICATION DEVICE
Filed Sept. 17, 1931    5 Sheets-Sheet 5

INVENTOR
JOHN L. CREVELING
BY
ATTORNEY

Patented Mar. 20, 1934

1,951,503

UNITED STATES PATENT OFFICE 1,951,503

LUBRICATION DEVICE

John L. Creveling, Tucson, Ariz., assignor to The Lubrication Corporation, South Bend, Ind., a corporation of Delaware Application September 17, 1931, Serial No. 563,410

16 Claims. (Cl. 221—47.4)

This invention relates to lubricating devices and more particularly to lubricating guns or pumps adapted to service lubrication fittings.

One of the objects of the invention is to provide lubricant guns or pumps which may be quickly, easily and securely attached to lubrication fittings, and which may be maintained clamped to the fittings while lubricant is being supplied under high pressure.

A further object of the invention is to provide a lubricating gun in which the lubricant pressure acts through a suitable coupling to clamp the gun to a fitting during the lubricating operation.

A further object of the invention is to provide a lubricating gun in which the coupling may be formed from a tube, and if desired, have an integral connection with the end wall of the cylinder forming the body of the gun.

Another object of the invention is to provide a lubricating gun that is compact in form and easily refilled.

Another object of the invention is to provide a lubricating gun that may have a universal movement in relation to its complementary fitting, whereby the gun may be used with fittings that are disposed in ordinarily inaccessible locations.

Another object of the invention is to provide a lubricating gun in which the coupling has a universal movement relative to the gun body.

Another object of the invention is to provide a lubricating gun with a substantially fluid tight universal joint arranged between the coupling and the body portion.

Another object of the invention is to provide a combined high and low pressure lubricating gun that may be used with fittings not readily accessible.

A further object of the invention is to provide a lubricating gun having a discharge nozzle which is slidable in the coupling and coacts therewith to form a clamp for the fitting.

Further objects will be apparent from a reading of the subjoined specification and claims and from a consideration of the accompanying drawings.

In order to explain the invention more clearly several embodiments thereof are shown in said drawings, in which:

Fig. 1 is a sectional view of one form of lubricant gun;

Fig. 2 is a sectional view of a different form;

Fig. 3 is a sectional view of another modified form;

Fig. 4 is a sectional view of another form;

Fig. 5 is a sectional view of a still different form;

Fig. 6 is a view of a detail of a lubricating gun somewhat similar to the one shown in Fig. 4;

Fig. 9 is a sectional view of a still different form;

Fig. 11 is a sectional view of another lubricating gun;

Fig. 12 is a similar view of a modified form;

Fig. 13 is an enlarged perspective view of the end portion of one of the couplings shown in Figs. 11 and 12.

Figure 7:
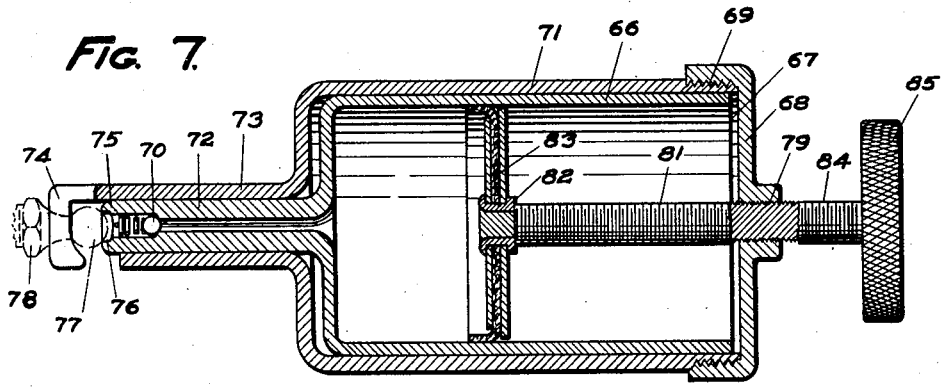
Fig. 7 is a sectional view of another modified form of lubricating gun.

Referring particularly to the drawings I have shown in Fig. 1 a cylinder or container 2 having one end 3 and having the other end 4 tapering to form a substantially reduced tubular plunger 5. Surrounding the tubular plunger 5 is a sleeve 6 having its forward end formed with a claw 7 adapted to engage the pin 8 of a fitting 9. The rear end of the sleeve 6 is secured to a pair of yoke members 11 and 12 which extend rearwardly and are secured by nuts 13 and 14 to a cross-arm 15. Journaled in the cross-arm 15 is a hollow shaft 16 which is restrained against movement relative to the cross-arm in one direction by a shoulder 17 formed on the shaft and against movement in the other direction by a nut 18 secured to the shaft. The forward end of the shaft 16 is threaded as at 19 and is screwed into an internally threaded piston 21, the piston 21 having an external diameter which corresponds substantially to the internal diameter of the cylinder 2. Thus rotation of the shaft 16 (while the piston 21 is restrained from rotation by reason of frictional engagement with the walls of the container 2) translates the piston 21 longitudinally of the container. Secured to the rear end of the shaft 16 is a hand wheel 22 by which the shaft 16 may be rotated, and positioned within the hollow of the shaft 16 is a plunger 23 provided with a handle 24, by means of which the plunger may be forced into and through the tubular plunger 5 to force lubricant under high pressure through said plunger 5 into the fitting 9.

In the operation of this type of pump or gun, the hand wheel 22 is first rotated to the left. The piston 21 is frictionally engaged with the walls of the cylinder 2 and the shaft 16 is thus caused to rotate in the piston. This causes the piston to move back along the shaft 16 toward the cross-arm 15. By reason of the frictional engagement of the piston 21 with the cylinder 2 and by reason of the suction exerted by the piston 21 through the lubricant in the container 2, this movement causes the container 2 also to move back relative to the cross-arm 15 and therefore relative to the sleeve 6. The plunger 5 which forms a part of the cylinder 2 is thus moved away from the claw 7 and allows the front end of the gun to be positioned over a fitting such as the fitting 9. The hand wheel 22 is next rotated in the opposite direction thus causing an opposite movement of the piston 21 relative to the cross arm 15 and by reason of the frictional engagement of the piston 21 with the cylinder and by reason of the pressure exerted by the piston through the lubricant on the sloping shoulders 4 also causing the container 2 and the plunger 5 to move forward to clamp the fitting securely in the front end thereof. Further rotation of the hand wheel 22 serves to insure that an adequate supply of lubricant is forced into the hollow of the tubular plunger 5 for delivery to the fitting. As soon as a stiff resistance to rotation of the hand wheel 22 is encountered, the operator pushes in on the plunger 23 by means of the handle 24 thus forcing the lubricant which is entrapped in the hollow of the plunger 5 into the fitting 9, under very high pressure owing to the small area of the plunger 23.

In describing the forms of my invention which differ from the forms shown in Fig. 1, I will designate substantially similar parts by like reference numerals, describing in detail only those which differ from the parts of the guns previously described.

The form of my invention shown in Fig. 2 is in many respects similar to that shown in Fig. 1. However, the sleeve 6 is not directly secured to the rearwardly extending portions of the casing, but is formed with a flange 25 upon which the rear end of a spring 26 bears. The forward end of the spring 26 bears on a flange 27 formed integrally with a cylindrical casing 28 which extends rearwardly and incloses the container 2. The rear end of the casing 28 is formed with inclined slots such as 29 and 30 into which lugs 31 and 32 formed on a rear cap 33 are adapted to extend and form a bayonet lock for holding the cap 33 secured to the casing 28.

The operation of this form of my invention is very similar to that described above in connection with the form shown in Fig. 1. However, in clamping the gun to the fitting to be lubricated, the spring 26 may be compressed and released.

The form of my invention shown in Fig. 3 is also very similar to that shown in Figs. 1 and 2. However, the casing 34 is formed at its rear end with external screw threads 35 onto which the cap 36 is screwed. Moreover, there are threads 37 formed on the shaft 16 extending rearwardly through the cap 36 which is itself internally screw threaded to receive the shaft and moreover the front end of the shaft 16 is secured to the piston 21 by a swivel joint 38 instead of being threaded therethrough.

The operation of the form of device shown in Fig. 3 is also similar to that shown in Fig. 1. However, the forward movement of the piston 21 is positive by reason of the engagement of the screw threads 37 with the cap 36, and the necessity of depending upon the frictional engagement of the piston 21 with the side walls of the container 2 to attain relative rotation between the piston and the shaft is eliminated.

In Fig. 4 I have shown a container 39 provided with a cap 35 through which may be screwed the solid shaft 40 formed with external screw threads 41 and provided at its front end with a piston 21. Secured within an opening in the front end of the container is a hollow shaft 42 formed with external screw threads 43 adapted to be screwed into an opening 44 formed in the rear end of the cylinder 45. Slidably mounted in the cylinder 45 is a tubular plunger 46 into the rear of which the front end of the hollow shaft 42 is slidably and rotatably mounted. The tubular plunger 46 is provided with a groove 47 through which lubricant may leak back to a chamber 48 formed at the rear of the plunger, for purposes to be later described. If desired, the threads 43 and the internal threads at 44 may be omitted and the gun operated as a high pressure push gun.

In the operation of this form of my invention, rotation of the handle 22 relative to the container 39 causes forward movement of the piston 21, and thus causes lubricant to move forward through the hollow shaft 42. Rotation of the container 39 relative to the cylinder 45 causes forward or rearward movement of the shaft 42 relative to the cylinder 45 and a consequent increase or decrease of lubricant in the bore of the plunger 46 and in the chamber 48. Therefore, by proper manipulation, the plunger 46 may be moved relative to the sleeve 45 by pressure or suction in the chamber 48, and the fitting 9 may be inserted in, clamped tightly, or released from the front end of the cylinder 45 between the plunger 46 and the claw 7. The lubricant pressure acting on the rear of the plunger 46 acts on a larger area and therefore is of greater force when acting to clamp the fitting than the pressure acting on the front end thereof to push the fitting away. After the fitting 9 has been firmly clamped in the end of the cylinder 45, further rotation of the container 39 relative to the cylinder 45 or of the handle 22 relative to the container 39 will force lubricant into the fitting 9. The lubricant forced by rotation of the handle 22 will act under relatively low pressure, while that forced by rotation of the container 39 relative to the cylinder 45 will be driven by relatively high pressure.

In the gun shown in Fig. 5, the container 49 is similar to the container 39 described above, and has formed integrally therewith an integral forward closure 50 which merges into a reduced tubular extension 51 slidably mounted in a slot 52 formed in a sleeve 53. Secured to the front end of the extension 51 and slidably mounted within the sleeve 53 is an open ended cylinder 54 having a lateral opening 55 into which the end of the extension 51 protrudes so that lubricant may be forced from the container 49 into the cylinder 54. A plunger 56 has its front end extending into the cylinder 54 and is formed with external screw threads 57 by which it is threaded into the rear end of the sleeve 53. It has a handle 58 by which it may be rotated to force it forward and to force lubricant under high pressure into the fitting 9. The rear end of the sleeve 53 may be closed or may partially open (as shown) inasmuch as the front end of the plunger 56 closes the rear end of the cylinder 54. The front end of the cylinder 54 is partially closed and has its outer surface beveled or chamfered as at 59, so that the area thereof in contact with the fitting 9 is less than the area of the front of the plunger 56.

In the operation of this form of my invention pressure on the lubricant in the cylinder 54 is relieved either by unscrewing the handle 22 or by unscrewing the handle 58. The cylinder 54 together with the container 49 may then be moved rearwardly relative to the sleeve 53, the extension 51 sliding in the slot 52, and thus the fitting 9 may be inserted in the front end of the sleeve 53. After the insertion, the container 49 and the cylinder 54 may be moved forward relative to the sleeve 53 to clamp the fitting in said front end. The lubricant may then be forced from the container 49 through the extension 51 into the cylinder 54, thus acting upon the front end of the plunger 56 to force the sleeve 53 further rearwardly relative to the cylinder 54, and securely clamping the fitting. By this action, some lubricant may be forced into the fitting, but as soon as a stiff resistance is encountered, the handle 58 should be rotated and the lubricant forced into the fitting by the solid plunger 56 acting with relatively high pressure. Alternatively, the fitting may be clamped and unclamped by rotation of the handle 58, inasmuch as such rotation causes a compression or a suction upon the lubricant in the cylinder 54, similarly to the action caused by rotation of the handle 52.

In Fig. 6 there is shown a cylinder 60 having its rear end substantially closed and provided with a slidable tubular plunger 61. Within the cylinder 60, the plunger 61 may move forward and rearward to clamp the fitting 9 against the hook 7 in the front end of the cylinder, and has suitably secured to the rear end thereof a tube 62 formed with a slot 63 leading to a chamber 64 formed adjacent to the rear end of the plunger 61 within the rear end of the cylinder 60. The rear end of the tube 62 is slidably mounted in a sleeve 65 corresponding to the extension 51 shown in Fig. 5 leading from a closed supply of lubricant such as the container 49 described above.

When lubricant is fed forward through the sleeve 65 it passes through the tube 62 and the hollow plunger 61 into the fitting 9. It also acts upon the rear end of the tube 62 and the rear end of the plunger 61 to force the plunger 61 into firm contact with the fitting to be lubricated. Manual force exerted to move the sleeve 65 forward relative to the fitting 9 causes the tube 62 to telescope within the sleeve 65 and inasmuch as the lubricant is confined within the container, forces a supply of said lubricant forward through the tube 62 under high pressure.

In Fig. 7 I have shown a cylindrical container 66 formed with an open rear end 67 which normally contacts with a cap 68. The cap 68 is formed with internal screw threads 69 having a relatively large pitch by means of which the cap is secured upon the rear end of an external casing 71 fitting over the container 66. The container 66 is shorter than the casing 71 so that there is always either at the forward or rearward end thereof a space between the end of the container and of the casing. It is thus possible for the container 66 to move longitudinally within the casing 71. The cylinder 66 is formed with a forward reduced tubular extension 72 and the casing 71 is formed with a forward reduced extension 73, the bore of the extension 72 being provided with a check valve 70. The forward end 75 of the extension 72 is formed with a lubricant pocket 76 by which the ball head 77 of the fitting 78 may be clamped against the claw 74 of the extension 73. The cap 68 has formed therein an internally threaded opening 79 through which a shaft 81 passes. The front end of the shaft 81 is secured by a swivel joint 82 to a piston 83 mounted to slide within the cylinder 66. The rear end of the shaft 81 is formed with external threads 84 of relatively small pitch and the extreme rear end thereof carries a handle 85 by means of which the shaft may be rotated. Through the reaction of the threads 85 with the threads 79, the piston 83 may thus be moved forward in the cylinder 66.

In clamping this form of gun onto the head of the fitting, the cap 68 is first unscrewed slightly from the casing 71, thus through the shaft 81 causing relative movement of the piston 83 and the casing 71 and consequently relative movement between the cylinder 66 together with its extension 72 and the extension 73 of the casing 71. Thereafter the cap is screwed tightly on to the casing 71, thus reversing the relative movement of the parts. Therefore, the head 77 may be inserted in, and clamped or released from the clamp formed by the claw 74 and the front end 75 of the extension 72. After the fitting has been securely clamped, lubricant may be forced through the tubular plunger 72 by rotation of the handle 85 and the consequent movement of the piston 83 relative to the cylinder 66. Optionally the fitting may be clamped or released by operation of the handle 85 inasmuch as movement of the piston 83 through suction or pressure on the lubricant is also adapted to move the plunger 72 relative to the claw 74.

Figure 8:
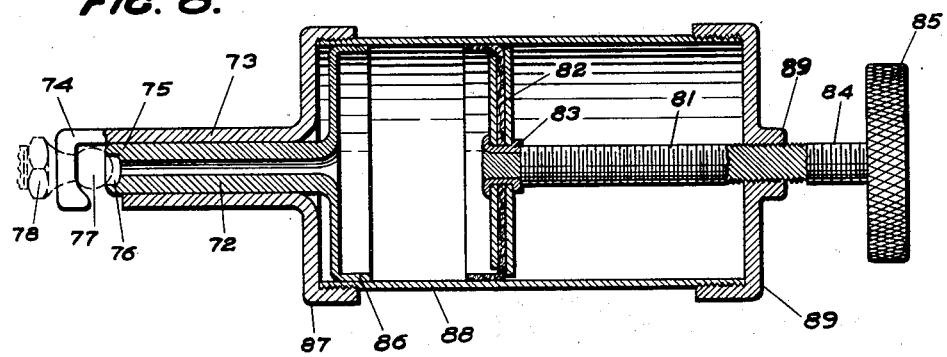
Fig. 8 is a sectional view of another form.

In the form of my invention shown in Fig. 8, the tubular extension 72 is not a part of a cylindrical container, but is merely extended rearward to form a piston 86, and likewise the extension 73 is merely extended rearward to form a cap 87. The cap 87 is suitably secured to the front end of a cylinder 88 which is formed with both ends open and which encloses the piston 86 as well as the piston 82. The rear end of the cylinder 88 has secured thereto in any suitable manner a cap 89 through which the shaft 81 is threaded in a manner similar to that described above in connection with the device shown in Fig. 7.

The operation of this form of my invention is similar to that described above in connection with the form shown in Fig. 7. However, the clamping of the fitting within the front end of the gun is accomplished by a rotation of the handle 85 which moves the piston 82 relative to the cap 89, the cylinder 88, and the sleeve 73 and through the pressure on or the suction of the lubricant moves the piston 86 and the tubular extension 72. Rotation of the handle 85 is also effective to force lubricant through the hollow plunger 72 into the fitting to be lubricated.

The gun shown in Fig. 9 is similar in some respects to the gun shown in Fig. 5, and in other respects is similar to the gun shown in Fig. 6, and in still other respects differs from both. There is provided a container 49a from which lubricant may be supplied through a reduced tubular extension 51a to the interior of the hollow plunger 54a. Thence it may pass forwardly to the fitting 9 or may pass rearwardly to a chamber 64a formed in the rear end of the cylinder 60a. A slot 52a is provided in the side of the cylinder 60a so that the extension 51a may slide back and forth in clamping the coupler to the fitting. A high pressure piston 23a is provided similar to that shown in Figs. 1, 2, and 3, and a low pressure piston (not shown) is also provided similar to the low pressure pistons shown in said Figs. 1, 2, and 3.

The operation of the gun shown in Fig. 9 will be apparent from the above description when considered in connection with the operation of the guns shown in Figs. 5 and 6.

Figure 10:
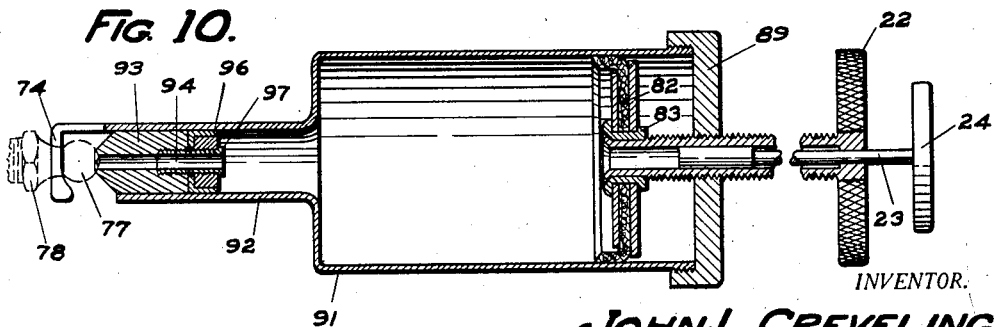
Fig. 10 is a sectional view of still another modified form.

In Fig. 10 is shown a different form of lubricant gun, similar in some respects to the guns shown in Figs. 1, 2, and 3, similar in other respects to the gun shown in Fig. 8, and differing in other respects from all of the other described modifications. Therein is shown a cylindrical container designated 91 having formed integrally therewith a reduced extension 92 within which is slidably mounted a tubular plunger 93 provided with a bore 94 and having secured to the inner end thereof a washer or a piston 96 by means of a hollow screw 97.

The operation of this form of lubrication gun is similar to the operation of guns previously described. The ball head 77 of the lubricant fitting 78 is inserted between the claw or end closure 74 and is clamped against said claw by compression of grease acting upon the piston 96, and the plunger 93. The grease is put under pressure either by rotation of the hand wheel 22 to move the low pressure piston 82 forward or by reciprocation of the high pressure piston 23. Operation of the handle 22 and reciprocation of the piston 23 are adapted also to force lubricant through the hollow screw 97 and the bore 94 of the plunger 93 into the fitting 78.

Referring to Fig. 11 of the drawings, 110 represents the gun body preferably cylindrical in form having a tubular extension 111 which, if desired, may be formed integral with the body 110. A lubricant container 112 is slidably nested within the body 110 and is provided with an extension 113 forming a discharge nozzle slidably disposed within extension 111. The outer end of body 110 is closed by a removable cover 114 having a stem 115 in threaded engagement therewith to which is secured a handle 116 preferably pinned to the stem 115 at 117. The inner end of stem 115 has a head portion 118 rotatably mounted between plates 119 and 121 which are secured together by rivets 122 and clamp compression washer 123 therebetween, to form a piston which may be reciprocated within the lubricant container 112 by rotation of the handle 116 to force lubricant through the discharge nozzle 113 to the fitting 124. The outer or coupling end 126 of extension 111 is provided with a lateral opening 127 communicating with the outer open end of extension 111 and the adjacent portions 128 are inwardly struck to reduce the outer opening to a slot having a dimension less than the diameter of the ball head of the fitting 124, the resultant opening being somewhat of the shape of a key-hole that will permit the ball to be inserted in the opening 127 and be clamped between the in-struck portions 128 and the 45 degree angled face 129 of the nozzle 113, when pressure is applied to the lubricant by rotation of handle 116. By the provision of the angled face the ball head of the fitting 124 may be clamped and serviced whether in the full line position, the dotted line position or intermediate positions.

It may be observed that lubricant container 112 is slidable with relation to both body 110 and the piston whereby pressure upon the lubricant causes both container 112 and nozzle 113 to move toward the left upon an application of pressure to the lubricant. I preferably form the slot 127 of the coupling 126 of sufficient size to allow fitting 124 to be rotated from the dotted line position shown in Fig. 11 to the full line aligned position shown therein, whereby the gun may service a fitting having an inlet opening axially of its stem, throughout a wide range of angles.

In the form shown in Fig. 12, the inner container has been omitted and body 132 is provided with a pair of pistons 133 and 134 between which lubricant is compressed by rotation of the handle 116. If desired, extension 136 may be formed integral with a removable closure member 137 and piston 134 may be directly connected with the nozzle member 113. The operation of the gun is substantially the same as the one shown in Fig. 11 and an application of pressure to the lubricant causes nozzle 113 to move toward the left and clamp fitting 124 between nozzle 113 and the in-struck portions 128 of the extension 126.

Figure 14:
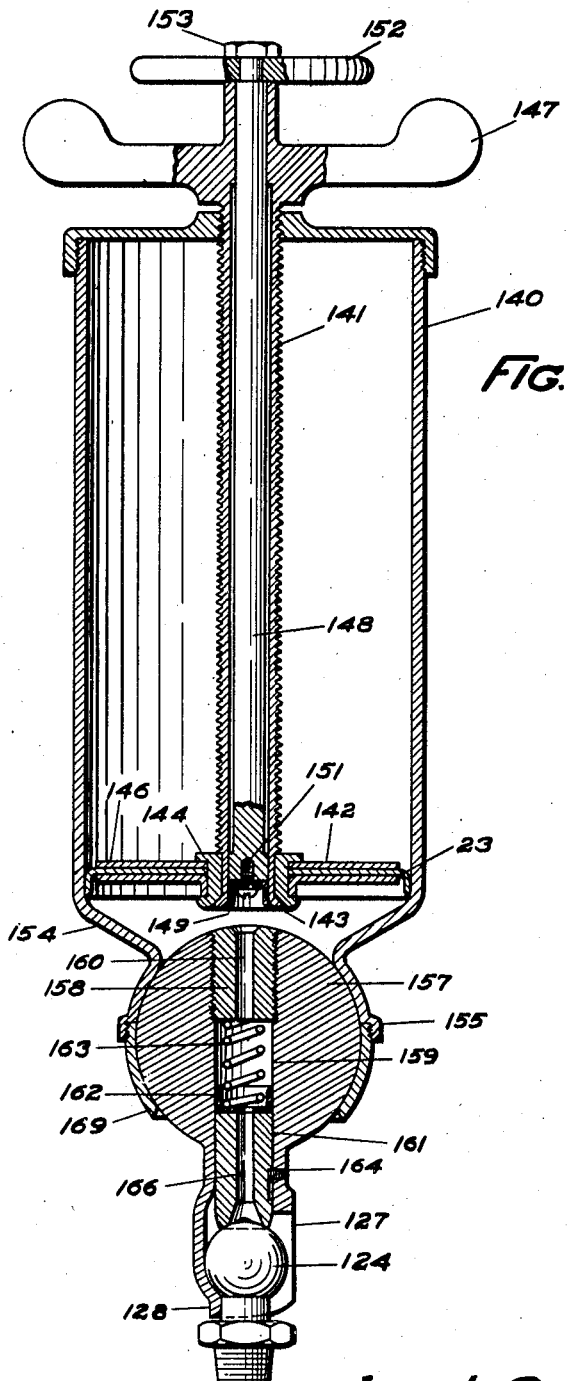
Fig. 14 is a sectional view of another modified form in which a universal joint is disposed between the coupling and the body of the gun.

In the form shown in Fig. 14, 140 is the body of the gun forming a low pressure lubricant container preferably cylindrical in form and within which is a high pressure cylinder 141 preferably having a threaded engagement with the outer end of the low pressure cylinder. A piston 142 is secured to the end of cylinder 141 in a manner to prevent axial movement and may be secured thereto by outwardly striking portions 143 of the high pressure cylinder to engage hub 144 of the piston which is provided with a washer 146 that enables the operator to apply pressure to the lubricant upon rotation of handle 147, which may be integral or otherwise secured to the cylinder 141. Within the high pressure cylinder 141 is a slidable plunger 148 having a compression washer 149 secured to its outer end by screw 151, which plunger is preferably of small area and adapted to be reciprocated within cylinder 141 by handle 152 which is secured to the upper end of the plunger by nut 153. The lower end of the body 140 may be inwardly-struck at 154 and outwardly-struck at 155 to provide a spherical seat or socket for the ball 157. Preferably, however, I form this socket or seat in two sections and after the insertion of the ball 157 secure the two section together by suitable means such as that shown. The ball 157 has a bore 159, the upper end of which is partially closed by a screw plug 158 formed with a concentric bore 160. In the lower end of the bore 159 there is a slidable nozzle 161 provided with a compression washer 162 and urged outwardly by a spring 163. Nozzle 161 is slidable within the tubular coupling 164 which has its outer end formed with instruck portions 128 and a lateral opening 127 similar to the couplings shown in Figs. 11, 12, and 13. Washer 162 preferably has an area larger than the area of the bore 166 in the nozzle 161, which arrangement insures a lubricant tight connection with fitting 124 during the operation of the gun, for with this selection of areas, the force of the lubricant acting upon the piston to clamp the fitting is greater than the force of the lubricant to separate the nozzle 161 from its contact with the fitting. Spherical socket 155 is preferably formed of a resilient material such as spring steel, which clamps ball 157 tightly within the socket, but it will also be noted that when pressure is applied to the lubricant, ball 157 is forced downwardly and forms a fluid tight seal with the lower portions 169 of the socket member. It will also be noted that bore 160 is in communication with the body of the gun through a wide range of angular relations, and that because of the two ball and socket connections between the body 140 and the fitting 124, that I have provided a lubricating gun which may be used with connections that would ordinarily be inaccessible. The outlets of both high pressure cylinder 141 and low pressure 140 are in communication with bore 160, and therefore, either high or low pressure may be applied to the lubricant without changing the position of the gun in its relation with the fitting.

While I have illustrated and described several embodiments of my invention, it is understood that this showing and description are illustrative only, and that I do not regard the invention as limited to the forms shown and described, or otherwise, except by the terms of the following claims.

I claim:

1. A lubricating gun comprising a body having a tubular extension, a lubricant container within the body having a nozzle slidable within the extension, a piston within the container, having a stem extending through the body, said extension and nozzle forming a clamp to engage a fitting, and a high pressure piston operable in said nozzle.

2. In a gun for servicing a fitting to be lubricated, a tubular sleeve having a claw secured thereto, a cylindrical plunger having a portion slidably mounted in said sleeve, a cylindrical container secured to said plunger, a screw associated with said cylindrical container, means responsive to relative rotative movement between said screw and said container for clamping the fitting between the plunger and the claw, and a high pressure piston operable in said cylindrical plunger.

3. In a gun for servicing a fitting to be lubricated, a lubricant container having a reduced cylindrical portion, a sleeve surrounding said cylindrical portion, a claw secured to said sleeve, a rearward extension secured to said sleeve, a laterally extending member secured to the rear end of said extension and formed with an opening, a piston slidably mounted in said container also formed with an opening, a bearing formed in one of said openings, a threaded shaft passing through said opening in said laterally extending member and through said opening in said piston, engaging in a bearing formed in one of said openings and having a threaded engagement in the other of said openings, and a high pressure plunger slidably mounted in said threaded shaft.

4. In a gun for servicing a fitting to be lubricated, a lubricant container having a reduced cylindrical portion, a sleeve surrounding said cylindrical portion having sliding contact with the walls thereof, a claw secured to said sleeve, a rearwardly extending yoke secured to said sleeve, a cross-arm to which the ends of said yoke are secured, having an opening formed therein, a piston slidably mounted in said container also having an opening formed therein, a bearing formed in one of said openings, and a threaded shaft passing through said opening in said cross-arm and through said opening in said piston engaging with said bearing formed in one of said openings and having a threaded engagement in the other of said openings.

5. In a gun for serving a fitting to be lubricated, a lubricant container having a reduced cylindrical portion, a sleeve surrounding said cylindrical portion, a claw secured to said sleeve, a rearward extension secured to said sleeve, a cross-arm secured to the rear end of said extension and formed with an opening, a piston slidably mounted in said container and formed with an opening, a threaded shaft passing through said opening in said cross-arm and through said opening in said piston engaging in a bearing formed in one of said openings and having a threaded engagement in the other of said openings, and a high pressure piston operable in said cylindrical portion of said container.

6. In a gun for servicing a fitting to be lubricated, a lubricant container, a tubular plunger formed by a reduced forwardly extending cylindrical portion of said container, a casing telescoping over said container, a reduced forward extension for said casing forming a sleeve and telescoping over said plunger, a claw associated with said sleeve, a piston slidably mounted in said container, a threaded shaft associated with said piston and with said casing, means including said shaft for moving said piston relative to said casing to cause relative movement between said plunger and said sleeve, and a high pressure piston operable in said tubular plunger.

7. In a gun for servicing a fitting to be lubricated, a lubricant container, a reduced forwardly extending cylindrical portion forming a tubular plunger, a casing telescoping over said container, a reduced forward extension for said casing telescoping over said plunger and forming a sleeve, a claw associated with said sleeve, and means for moving said claw relative to said plunger for clamping the fitting, comprising a piston slidably mounted in said container, a threaded shaft associated with said piston and with said casing, a handle for moving said piston to cause relative movement between said container and said casing, and a high pressure piston operable in said tubular plunger.

8. In a gun for servicing a fitting to be lubricated, a lubricant container having a reduced cylindrical portion, a sleeve surrounding said cylindrical portion, a claw secured to said sleeve, a rearward extension associated with said sleeve, a laterally extending member secured to the rear of said extension having an opening formed therein, a piston slidably mounted in said container also having an opening formed therein, a bearing formed in one of said openings, a threaded shaft passing through said opening in said laterally extending member and through said opening in said piston engaging with said bearing formed in one of said openings and having a threaded engagement in the other of said openings, and a spring interposed between said sleeve and said rearward extension.

9. In a gun for servicing a fitting to be lubricated, a lubricant container having a reduced forwardly extending cylindrical portion, a sleeve surrounding said cylindrical portion, a claw secured to said sleeve, a rearward extension resiliently connected with said sleeve, a cap secured to said rearward extension by a bayonet joint, a piston in said container, a screw connected to said piston, and means for turning said screw to move said piston to cause relative movement between said container and said rearward extension.

10. In a gun for servicing a fitting to be lubricated, a cylindrical container formed with one open end, a cylindrical casing telescoping over said container formed with an open end and having external screw threads formed thereon adjacent to said end, a cover for the end of said casing formed with internal screw threads and screwed upon said end, a reduced extension on said container forming a tubular plunger, a reduced tubular extension on said casing forming a sleeve engageable with the outer side walls of said tubular extension, a claw secured to said sleeve, a piston mounted in said container, a threaded shaft connected to said piston, and a high pressure piston in said tubular plunger.

11. In a gun for servicing a fitting to be lubricated, a stationary portion, a lubricant container movable relative to said stationary portion, means for forcing lubricant from said container under relatively low pressure, and means for forcing lubricant from said container under relatively high pressure, said stationary portion and said container cooperating to form a fitting clamping device.

12. In a gun for servicing a fitting to be lubricated, a sleeve, a lubricant container movable relative to said sleeve to cooperate with the sleeve to clamp the fitting, means for forcing lubricant from said container under relatively low pressure, and means for forcing lubricant from said container under relatively high pressure, said sleeve and said container cooperating to form a fitting clamping device.

13. In a gun for servicing a fitting to be lubricated, a stationary portion, a cylinder formed with a reduced extension and movable relative to said stationary portion to clamp the fitting, and a plunger movable in said cylinder into said reduced extension to force lubricant therefrom under relatively high pressure.

14. In a gun for servicing a fitting to be lubricated, a stationary portion, a cylinder movable relative to said stationary portion to clamp the fitting, a piston movable in said cylinder for forcing lubricant therefrom under relatively low pressure, and a plunger movable in said cylinder for forcing lubricant therefrom under relatively high pressure.

15. A lubricating gun comprising a body having a tubular extension, a lubricant container slidable within the body having a nozzle extending within said tubular extension and guided by the inner side walls thereof, a piston within the container having a stem extending through the body, said extension and said nozzle forming a clamp to engage a fitting and a high pressure piston operable in said nozzle and extending through said stem to a point beyond the end of the stem.

16. In a gun for servicing a fitting to be lubricated, a hollow body member having a fitting engaging member at its outer end and providing a cylindrical guide-way portion rearwardly of the fitting engaging member, a cylinder assembly movable relative to said body member providing a low pressure cylinder and a high pressure cylinder, a low pressure piston in said low pressure cylinder, a high pressure piston in said high pressure cylinder, said high pressure cylinder being located within said body guide-way and formed at its outer end with a discharge port, the orifice walls of which are adapted to register with the port walls of said fitting to effect a seal therebetween, and means facilitating the operation of said pistons in their respective cylinders and for simultaneously urging said cylinder assembly forwardly of the body under force of lubricant pressure developed in said cylinders to cause relative thrust between said discharge orifice walls and said fitting.

JOHN L. CREVELING.